No. 784,481. PATENTED MAR. 7, 1905.
P. DIXON.
FLUE EXPANDER.
APPLICATION FILED JUNE 23, 1904.
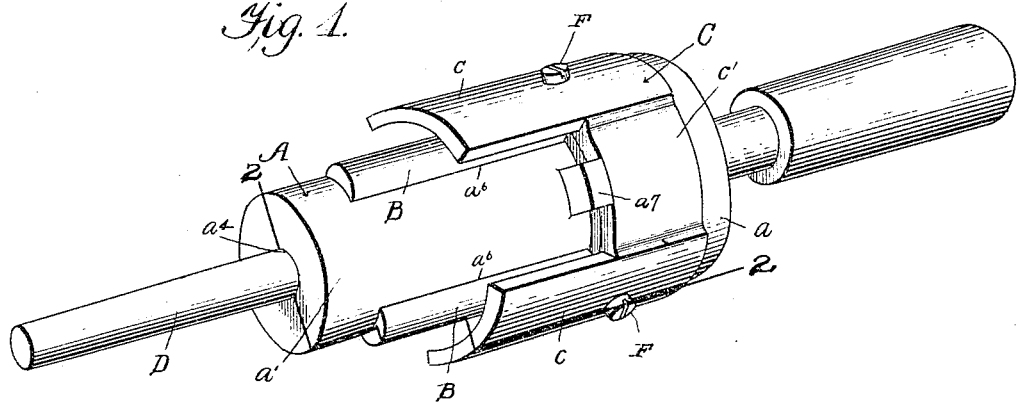
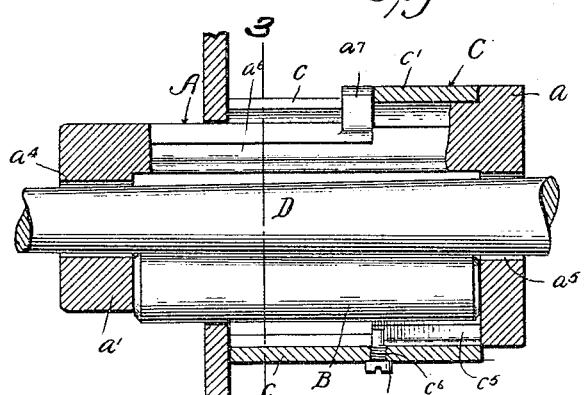
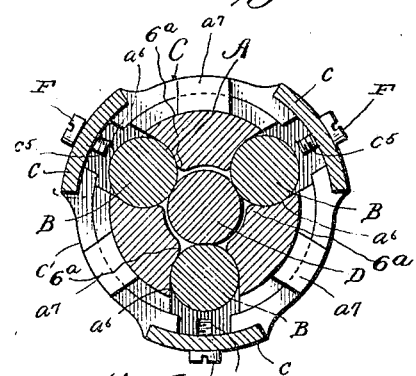
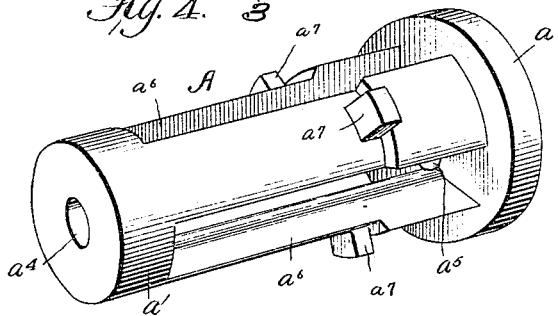
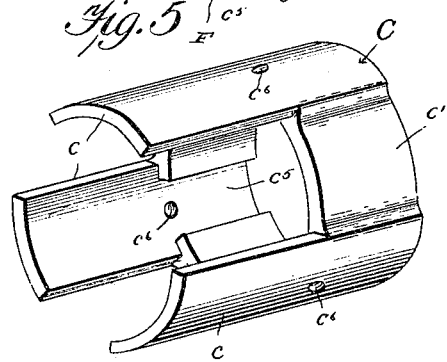
WITNESSES:
O. W. Holmes.
John T. Schrott.
INVENTOR
Patrick Dixon.
BY
Fred G. Dieterich & Co.
ATTORNEYS No. 784,481.

Patented March 7, 1905.

UNITED STATES PATENT OFFICE.

PATRICK DIXON, OF BLOOMINGTON, ILLINOIS.

FLUE-EXPANDER.

SPECIFICATION forming part of Letters Patent No. 784,481, dated March 7, 1905.

Application filed June 23, 1904. Serial No. 213,805.

*To all whom it may concern:*

Be it known that I, PATRICK DIXON, residing at Bloomington, in the county of McLean and State of Illinois, have invented certain new and useful Improvements in Flue-Expanders, of which the following is a specification.

This invention seeks to provide a new and improved implement for expanding boiler-tubes whereby to firmly secure them in the flue-sheets in a simple, safe, expeditious, and efficient manner, and in its generic nature the said invention comprehends an improved construction and coöperative arrangement of cage or roller-frame and a gage member whereby in the use of my expander danger of driving the flue out of position is avoided and the rollers prevented from shifting out of their adjusted or desired position.

My invention also embodies an improved construction of roller-holding cage or frame having a specially-designed outer end for allowing the rollers the required space for rotating without coming in contact with the gage, whereby to leave the said gage at all times free from contacting with the roller cage or frame and for holding the rollers mounted on the cage or frame in their desired adjustment and in such a manner as to provide for making a joint parallel with the opening in the tube-sheet.

In its more subordinate features my invention consists in certain details of construction and peculiar combination of parts, all of which will be hereinafter fully described and claimed, and illustrated in the accompanying drawings, in which—

Figure 1 is a perspective view of my improved flue-expander. Fig. 2 is a longitudinal section of the same, taken practically on the line 2 2 of Fig. 1. Fig. 3 is a transverse section of the same, taken substantially on the line 3 3 of Fig. 2. Fig. 4 is a perspective view of a roller-holding cage or frame. Fig. 5 is a similar view of a gage portion of my improved implement.

In the practical application of my invention the same embodies a cage A, which consists of a base having a rim portion $a$ and a cylindrical portion $a'$ of a diameter less than that of the base portion $a$, whereby to provide ample space between the periphery of the expanding and swaging rollers B B, supported on the cage or frame, and the gage arms or extensions $c\ c$ of the gage C to permit of a free rotation of the rollers within the said gage members $c\ c$ without contact therewith. At the rim end the cage A has a similar opening $a^5$, which alines with the opening $a^4$ in the outer end of the cylindrical portion or shank $a'$, and the said openings $a^4\ a^5$ are of suitable diameter to receive the tapering mandrel D, as shown. The cage A at equidistant points is formed with radial openings $a^6\ a^6$, that terminate in inwardly-projecting shoulders $6^a$, and in each of said openings is loosely fitted one of the tapering rollers B B.

The gage C is loosely mounted upon the arm or thickened end of the cage A, and the said gage comprises a sleeve portion $c'$ of a diameter approximately that of the rim of the cage A and a series of integral arms $c$, that extend forward in the plane parallel with the cage-shank $a'$. The thickened end of the gage C has three longitudinally-extended internal recesses $c^5\ c^5$, and the cylindrical extension $a'$ of the cage A has three radially-projected lugs $a^7\ a^7$, which lugs act as detents for holding the gage C from working off the cage A when the members are adjusted for use, and to further hold the cage in operative position three set-screws F F F, one for each extension or arm $c$, are provided, which screws take in threaded and radially-disposed apertures $c^6\ c^6$, formed in the gage C and located at the rear of the lugs $a^7\ a^7$, whereby to prevent the said gage sliding off when the lugs $a^7$ and the recesses $c^5\ c^5$ are in register, and the said screws F serve the additional function of holding the rollers B from coming into the recesses $c^5\ c^5$ when they are overbalanced during the operation of rotating the said cage that carries the rollers. The rollers B are tapered reversely to the taper of the mandrel, and they rest against the shoulders $6^a$, as clearly shown in Fig. 3.

From the foregoing description, taken in connection with the accompanying drawings, the advantages and manner of operation of my invention, it is believed, will be readily understood.

The several parts that constitute my improved device are coöperatively arranged in such a manner that all danger of injury to the operator by bursting of the flue in the act of plugging is overcome. Furthermore, the parts are so combined that should the flues be one inch, more or less, too long the implement will still operate to expand the said tubes. The several parts can be readily separated or assembled, and their arrangement is such that they will not be readily broken or wear out.

It will be understood that in the act of expanding the tubes the mandrel D is withdrawn until the said rollers can be pressed inward sufficiently to permit of the insertion of the front end of the cage or frame, with the rollers, into the flue, with the gage C fitting over the end of the said flue and bearing against the flue-sheet. The mandrel D is then pressed inwardly until the rollers are caused to bear firmly against the interior of the flue, after which the mandrel, with the cage, is rotated by any suitable means.

Having thus described my invention, what I claim, and desire to secure by Letters Patent, is—

1. The combination of a cage which comprises a base portion and a cylindrical extension, the latter being of less diameter than the base portion and having a series of equidistant tapering, longitudinally-extended radial slots, said cage also having axial openings to receive the mandrel and the cylindrical portion thereof having radial projections, a tapering mandrel and a gage rotatably mounted on the cage between its inner end and the radial projections, said gage including forwardly-projecting arms and having a series of internal longitudinal recesses having a depth greater than the length of the radial projections on the cage, and tapering rollers adapted to seat in the radial openings in the cage, for the purposes specified.

2. The hereinbefore-described tube-expander which comprises in combination, a cage or frame having a base or head portion formed with an annular rim, and a cylindrical extension of less diameter than the base portion, said extension and base having alining axial apertures and the extension being formed with a series of radial slots to receive the swaging-rollers, a swaging-roller detachably mounted in each of the said slots, the said extension being also provided with a series of radial lugs, a gage which comprises a sleeve portion loosely rotatable upon the base of the cage between its annular rim and the radial lugs and having forwardly-projecting arms disposed in a plane parallel with the longitudinal axis of the cage, the sleeve of the said gage having internal longitudinal recesses, and set-screws carried by the gage that project into the recesses, for the purposes specified.

PATRICK DIXON.

Witnesses:
J. H. ROWELL,
JACOB P. LINDLEY.